(12) United States Patent
Gong et al.

(10) Patent No.: US 7,825,181 B2
(45) Date of Patent: Nov. 2, 2010

(54) MODIFIED LAYERED FILLERS AND THEIR USE TO PRODUCE NANOCOMPOSITE COMPOSITIONS

(75) Inventors: Caiguo Gong, Pearland, TX (US); Weiqing Weng, Houston, TX (US); Mun Fu Tse, Seabrook, TX (US); Anthony J. Dias, Houston, TX (US); James P. Stokes, Katy, TX (US); Alan A. Galuska, Glen Gardener, NJ (US); Beverly J. Poole, Houston, TX (US); Carmen Neagu, Friendswood, TX (US); Kriss R. Karp, Uniontown, OH (US); Molly W. Johnston, Baytown, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 11/791,571

(22) PCT Filed: Oct. 7, 2005

(86) PCT No.: PCT/US2005/036013

§ 371 (c)(1),
(2), (4) Date: May 24, 2007

(87) PCT Pub. No.: WO2006/062572

PCT Pub. Date: Jun. 15, 2006

(65) Prior Publication Data

US 2008/0081866 A1    Apr. 3, 2008

Related U.S. Application Data

(60) Provisional application No. 60/632,828, filed on Dec. 3, 2004.

(51) Int. Cl.
*B29C 73/00* (2006.01)
*C08K 7/04* (2006.01)
*C09D 101/18* (2006.01)

(52) U.S. Cl. .......... 524/445; 524/32; 524/449; 523/166

(58) Field of Classification Search .......... 525/192, 525/196, 191; 524/490, 515, 519, 567, 578, 524/442, 444–445, 449, 32; 152/525; 523/166, 523/216, 351; 428/454
See application file for complete search history.

(56) References Cited

U.S. PATENT DOCUMENTS

| | | | |
|---|---|---|---|
| 5,576,372 A * | 11/1996 | Kresge et al. | 524/442 |
| 5,576,373 A | 11/1996 | Kresge et al. | |
| 5,665,183 A | 9/1997 | Kresge et al. | |
| 5,807,629 A | 9/1998 | Elspass et al. | |
| 5,936,023 A | 8/1999 | Kato et al. | |
| 6,121,361 A | 9/2000 | Usuki et al. | |
| 6,787,592 B1 | 9/2004 | Powell et al. | |
| 2004/0132894 A1 * | 7/2004 | Dias et al. | 524/515 |
| 2004/0249046 A1 * | 12/2004 | Abhari et al. | 524/474 |
| 2005/0027057 A1 * | 2/2005 | Dias et al. | 524/445 |
| 2006/0128867 A1 * | 6/2006 | Marx et al. | 524/445 |
| 2006/0167184 A1 * | 7/2006 | Waddell et al. | 525/192 |

FOREIGN PATENT DOCUMENTS

| | | |
|---|---|---|
| WO | WO 94/22680 | 10/1994 |
| WO | WO 01/85831 | 11/2001 |
| WO | WO 02/100935 | 12/2002 |
| WO | WO 02/100936 | 12/2002 |
| WO | WO 2004/058874 | 7/2004 |

* cited by examiner

*Primary Examiner*—Vasu Jagannathan
*Assistant Examiner*—Hannah Pak
(74) *Attorney, Agent, or Firm*—Nancy T. Krawczyk; Xiaobing Feng

(57) ABSTRACT

The present invention relates to modified layered fillers made from layered fillers and modifying agents and processes to produce the same. The invention also relates to nanocomposite compositions made from these modified layered fillers and elastomers, and processes to produce the same, and their use in articles.

20 Claims, 6 Drawing Sheets

MODIFIED LAYERED FILLERS AND THEIR USE TO PRODUCE NANOCOMPOSITE COMPOSITIONS

CROSS REFERENCE TO RELATED APPLICATIONS

This application is a 371 National Stage Application of International Application No. PCT/US2005/036013, filed Oct. 7, 2005, and claims the benefit of Ser. No. 60/632,828, filed Dec. 3, 2004, the disclosure of which are herein incorporated by reference in their entireties.

FIELD OF THE INVENTION

The present invention relates to modified layered fillers made from layered fillers and modifying agents and processes to produce the same. The invention also relates to nanocomposite compositions made from these modified layered fillers and elastomers, and processes to produce the same, and their use in articles.

BACKGROUND OF THE INVENTION

Nanocomposite materials have been the subject of much academic and industrial literature due to a large extent on their ability to impart new properties for a given material. In particular, polymeric nanocomposites, such as elastomer-clay nanocomposites, have been of considerable interest. As used here, nanocomposites or polymeric nanocomposites are typically polymer systems containing inorganic particles with at least one dimension in the nanometer range of the polymer matrix.

The preparation of nanocomposites uses a number of methods to generate exfoliated clays. One of the most common methods relies upon the use of organically modified montmorillonite clays. Organoclays are typically produced through solution based ion-exchange reactions that replace sodium ions that exist on the surface of sodium montmorillonite with organic molecules such as alkyl or aryl ammonium compounds and typically known in the industry as swelling or exfoliating agents. See, e.g., U.S. Pat. No. 5,807,629, WO 02/100935, and WO 02/100936. Other background references include U.S. Pat. Nos. 5,576,373, 5,665,183, 5,807,629, 5,936,023, 6,121,361, WO 94/22680, WO 01/85831, and WO 04/058874.

However, the alkyl chain length/type of many ammonium compounds limits the separation as shown, for example, in d-spacing between layers and the compatibility between the alkyl chains and polymer backbone. Therefore, new exfoliating agents are needed for improvements to modified layer fillers to produce nanocomposite compositions with improved properties such as better barrier properties for innerliner applications.

BRIEF SUMMARY OF THE INVENTION

In embodiment, the invention provides for a modified layered filler comprising at least one layered filler and at least one modifying agent comprising at least one polymer chain E comprising a carbon chain length of from $C_{25}$ to $C_{500}$ and an ammonium-functionalized group.

In another embodiment, the invention provides for a nanocomposite composition comprising: an elastomeric composition, and a modified layered filler comprising: at least one layered filler and at least one modifying agent comprising at least one polymer chain E comprising a carbon chain length of from $C_{25}$ to $C_{500}$ and an ammonium-functionalized group.

In yet another embodiment, the invention provides for an article comprising a nanocomposite composition comprising: an elastomeric composition; a modified layered filler comprising: at least one layered filler and at least one modifying agent comprising at least one polymer chain E comprising a carbon chain length of from $C_{25}$ to $C_{500}$ and an ammonium-functionalized group; at least one curative package; and optionally, at least one additional filler, optionally, at least one cross-linking agent, optionally, at least one processing aid, optionally, at least one plastomer; or optionally, mixtures thereof.

In any of the previous embodiments, the ammonium-functionalized group may be described by the following group pendant to the polymer chain E:

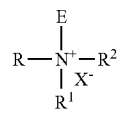

wherein each R, $R^1$ and $R^2$ are the same or different and independently selected from hydrogen, $C_1$ to $C_{26}$ alkyl, alkenes or aryls, substituted $C_1$ to $C_{26}$ alkyls, alkenes or aryls, $C_1$ to $C_{26}$ aliphatic alcohols or ethers, $C_1$ to $C_{26}$ carboxylic acids, nitrites, ethoxylated amines, acrylates and esters; and wherein X is a counterion of ammonium such as $Br^-$, $Cl^-$, or $PF_6^-$.

DETAILED DESCRIPTION OF THE INVENTION

Figure 1:
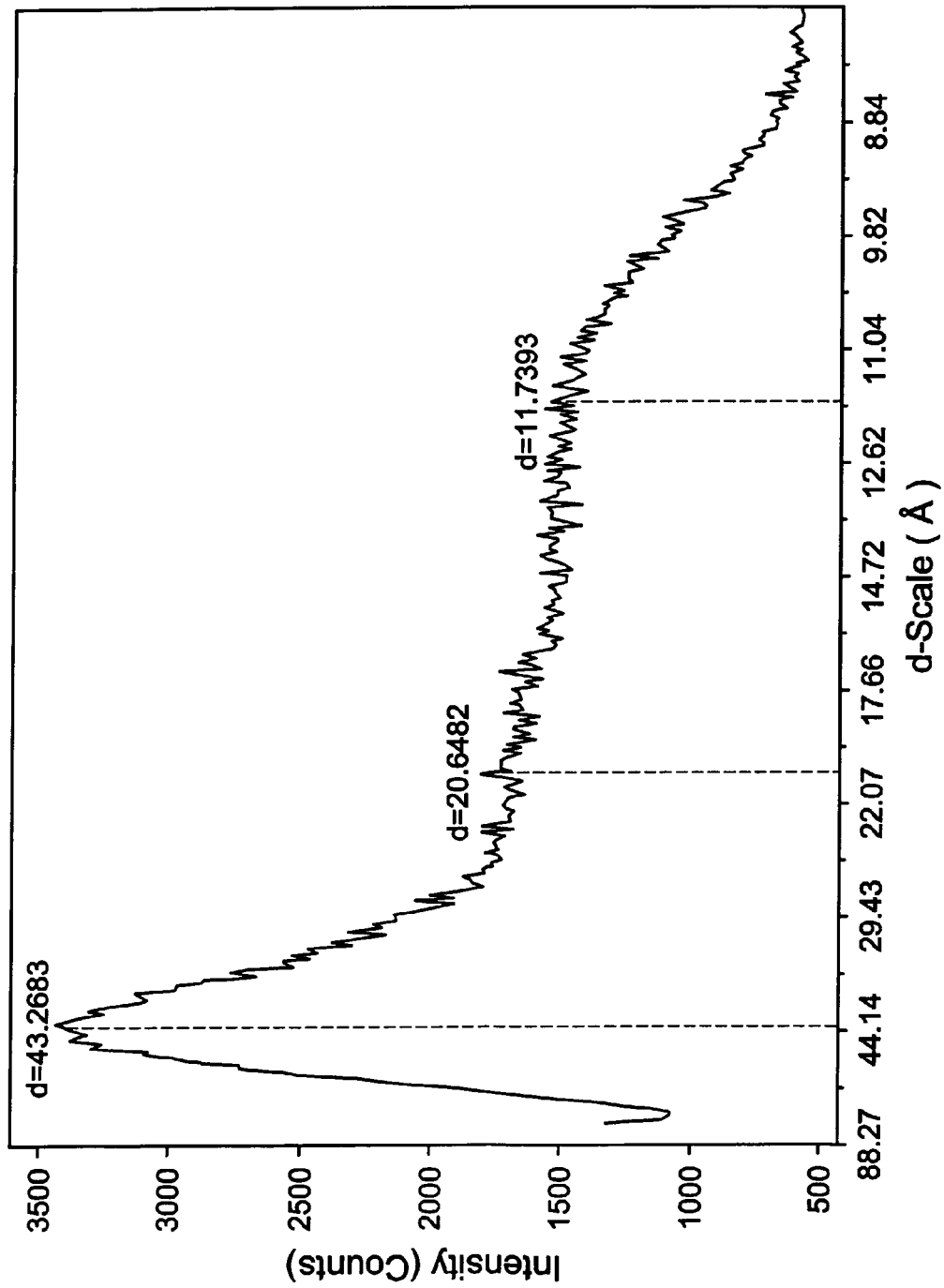
FIG. 1 shows a d-spacing graph of the modified clay from example 1.

Various specific embodiments, versions and examples of the invention will now be described, including preferred embodiments and definitions that are adopted herein for purposes of understanding the claimed invention. For determining infringement, the scope of the "invention" will refer to any one or more of the appended claims, including their equivalents, and elements or limitations that are equivalent to those that are recited.

As used herein, the new numbering scheme for the Periodic Table Groups is used as set forth in CHEMICAL AND ENGINEERING NEWS, 63(5), 27 (1985).

As used herein, a polymer may be used to refer to homopolymers, copolymers, interpolymers, terpolymers, etc. Likewise, a copolymer may refer to a polymer comprising at least two monomers, optionally with other monomers.

As used herein, when a polymer is referred to as comprising a monomer, the monomer is present in the polymer in the polymerized form of the monomer or in the derivative form the monomer. Likewise, when catalyst components are described as comprising neutral stable forms of the components, it is well understood by one skilled in the art, that the ionic form of the component is the form that reacts with the monomers to produce polymers.

As used herein, when a modified layered filler is described as comprising certain components, those components are present in their synthesized form or derivative form (i.e., recognizing, for example, the chemical and physical interactions between the components such as those between the layered fillers and modifying agents) and/or the changes that might occur during the synthesis of the modified layered clay.

As used herein, when a nanocomposite is described as comprising certain components, those components are present in their synthesized form or derivative form (i.e., recognizing, for example, the chemical and physical interactions between the components such as those between the elastomers and modified layered fillers and other components) and/or the changes that might occur during the synthesis of the nanocomposite.

As used herein, elastomer or elastomeric composition, as used herein, refers to any polymer or composition of polymers (such as blends of polymers) consistent with the ASTM D1566 definition. Elastomer includes mixed blends of polymers such as melt mixing and/or reactor blends of polymers. The terms may be used interchangeably with the term "rubber(s)."

As used herein, phr is parts per hundred rubber, and is a measure common in the art wherein components of a composition are measured relative to a major elastomer component, based upon 100 parts by weight of the elastomer(s) or rubber(s).

As used herein, isobutylene based elastomer or polymer refers to elastomers or polymers comprising at least 70 mol % repeat units from isobutylene.

As used herein, isoolefin refers to any olefin monomer having at least one carbon having two substitutions on that carbon.

As used herein, multiolefin refers to any monomer having two or more double bonds, for example, a multiolefin may be any monomer comprising two conjugated double bonds such as a conjugated diene such as isoprene.

As used herein, nanocomposite or nanocomposite composition refers to polymer systems containing inorganic particles with at least one dimension in the nanometer range within a polymer matrix.

As used herein, intercalation refers to the state of a composition in which a polymer is present between each layer of a platelet filler. As is recognized in the industry and by academia, some indicia of intercalation can be the shifting and/or weakening of detection of an X-ray lines as compared to that of original platelet fillers, indicating a larger spacing between vermiculite layers than in the original mineral.

As used herein, exfoliation refers to the separation of individual layers of the original particle, so that polymer surrounds each particle. In an embodiment, so much polymer is present between each platelet, that the platelets may be randomly spaced. For example, some indication of exfoliation or intercalation may be a plot showing no X-ray lines or larger d-spacing, because of the random spacing ore increased separation of layered platelets as discussed in more detail below. However, as recognized in the industry and by academia, other indicia may be useful to indicate the results of exfoliation such as permeability testing, electron microscopy, atomic force microscopy, etc.

As used herein, solvent refers to any substance capable of dissolving another substance. When the term solvent is used it may refer to at least one solvent or two or more solvents unless specified. In certain embodiments, the solvent is polar; in other embodiments, the solvent is non-polar.

As used herein, solution refers to a uniformly dispersed mixture at the molecular level or ionic level, of one or more substances (solute) in one or more substances (solvent). For example, solution process refers to a mixing process that both the elastomer and the modified layered filler remain in the same organic solvent or solvent mixtures.

As used herein, hydrocarbon refers to molecules or segments of molecules containing primarily hydrogen and carbon atoms. In some embodiments, hydrocarbon also includes halogenated versions of hydrocarbons and versions containing heteroatoms as discussed in more detail below.

Permeability testing proceeded according to the following description. All examples were compression molded with slow cooling to provide defect free pads. A compression and curing press was used for rubber samples. Typical thickness of a compression molded pad is around 0.38 mm using an Carver press, 2" diameter disks were then punched out from molded pads for permeability testing. These disks were conditioned in a vacuum oven at 60° C. overnight prior to the measurement. The oxygen permeation measurements were done using a Mocon OX-TRAN 2/61 permeability tester at 40° C. under the principle of R. A. Pasternak et. al. in Vol. 8 JOURNAL OF POLYMER SCIENCE: PART A-2 467 (1970). Disks thus prepared were mounted on a template and sealed with a vacuum grease. A steady flow of oxygen at 10 mL/min was maintained on one side of the disk, while a steady flow of nitrogen at 10 mL/min was maintained on the other side of the disk. Using the oxygen sensor on the nitrogen side, increase in oxygen concentration on the nitrogen side with time could be monitored. The time required for oxygen to permeate through the disk, or for oxygen concentration on the nitrogen side to reach a constant value, is recorded and used to determine the oxygen gas permeability.

Figure 2:
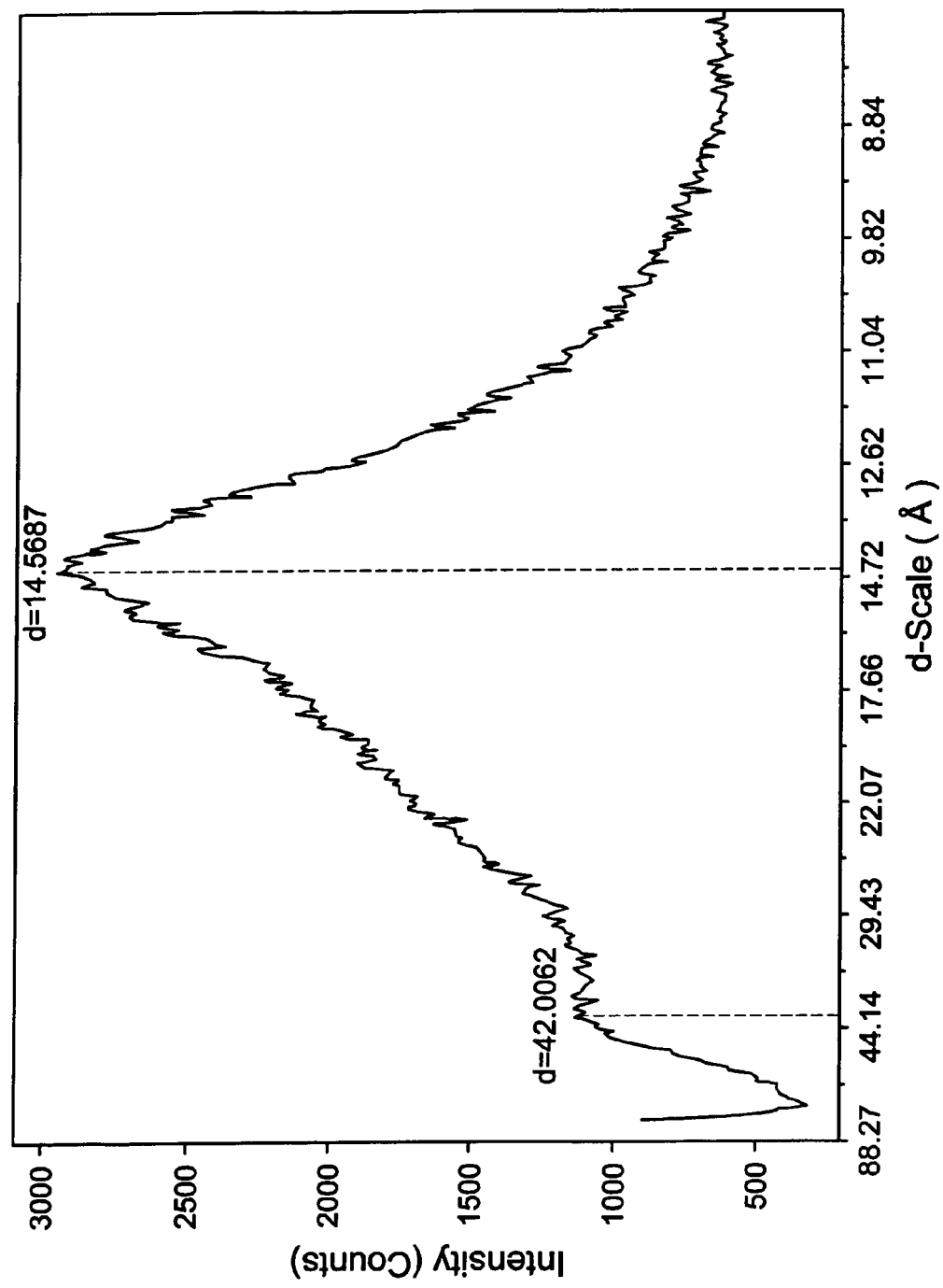
FIG. 2 shows a d-spacing graph of the modified clay from example 2.
Figure 3:
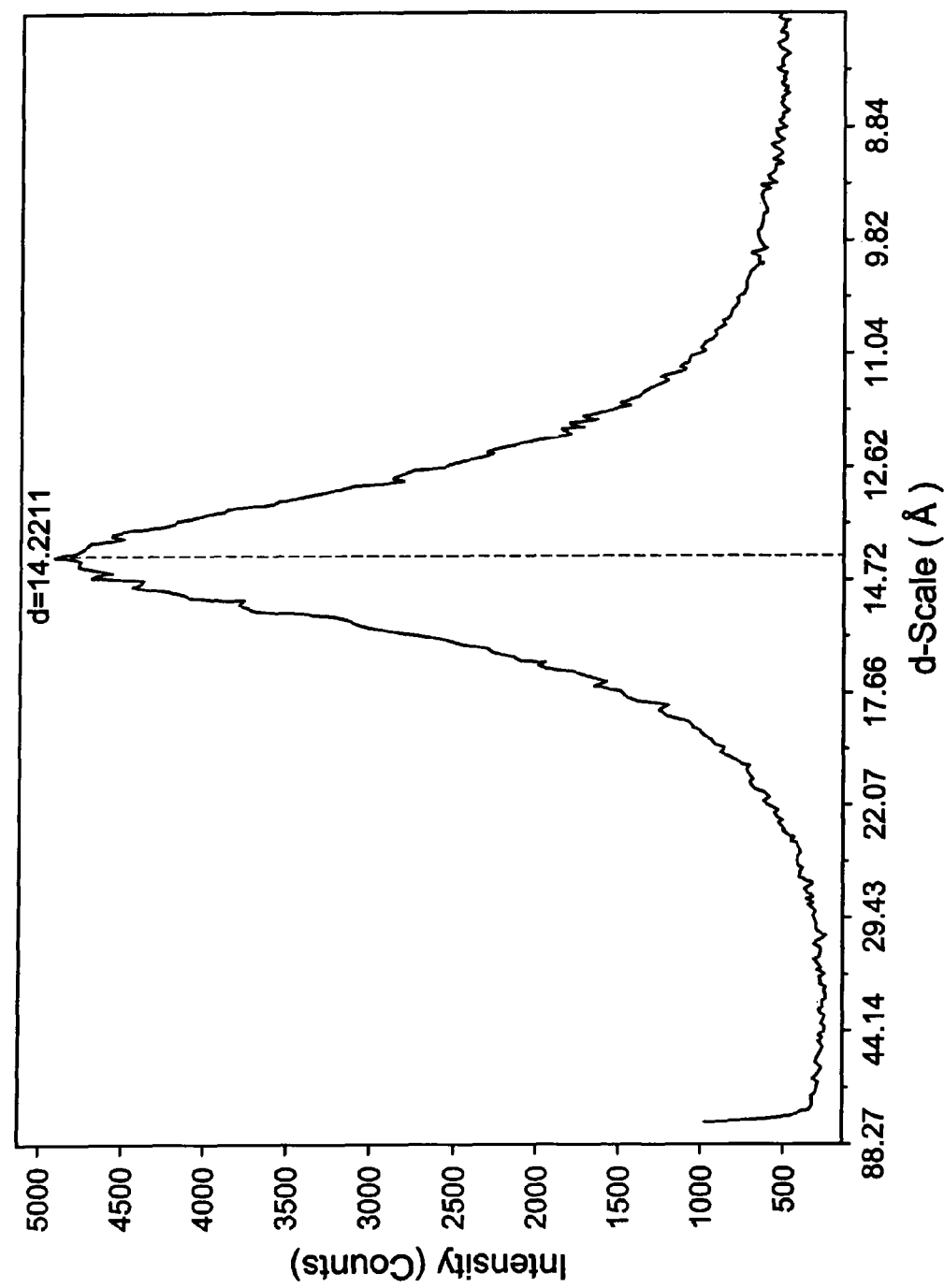
FIG. 3 shows a d-spacing graph of the modified clay from example 3.
Figure 4:
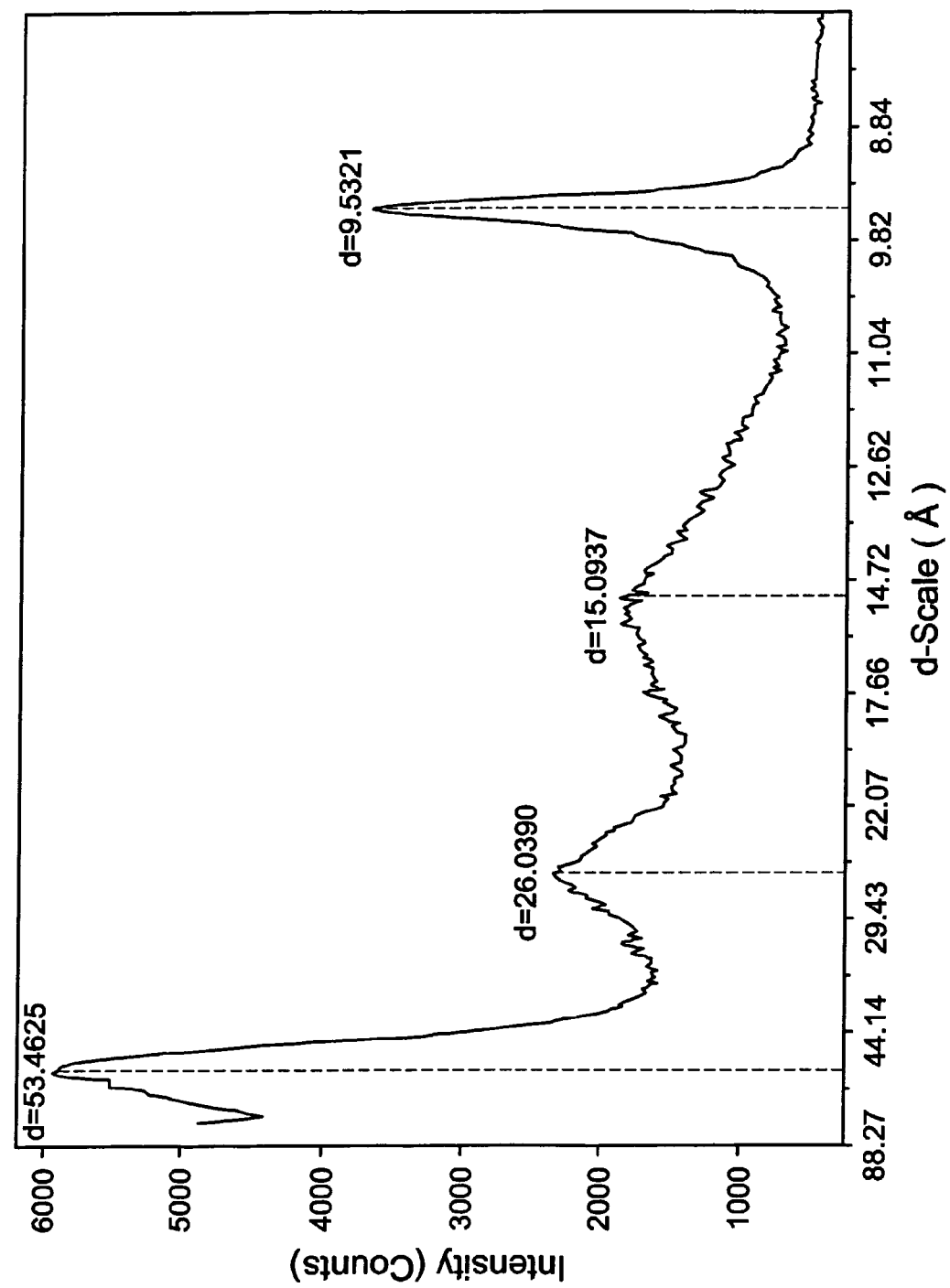
FIG. 4 shows a d-spacing graph of the modified clay from example 4.
Figure 5:
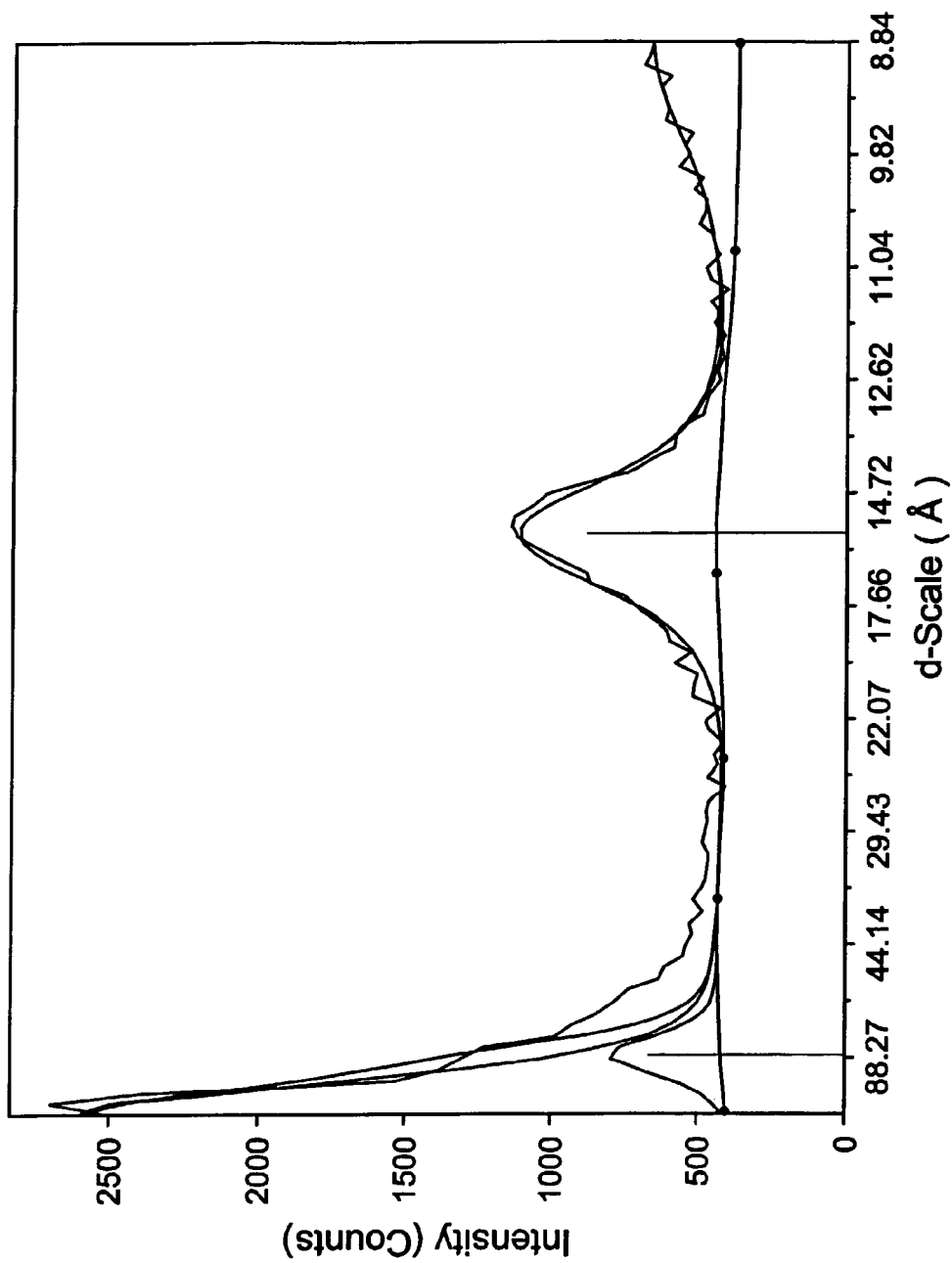
FIG. 5 shows a d-spacing graph of the modified clay from example 8.
Figure 6:
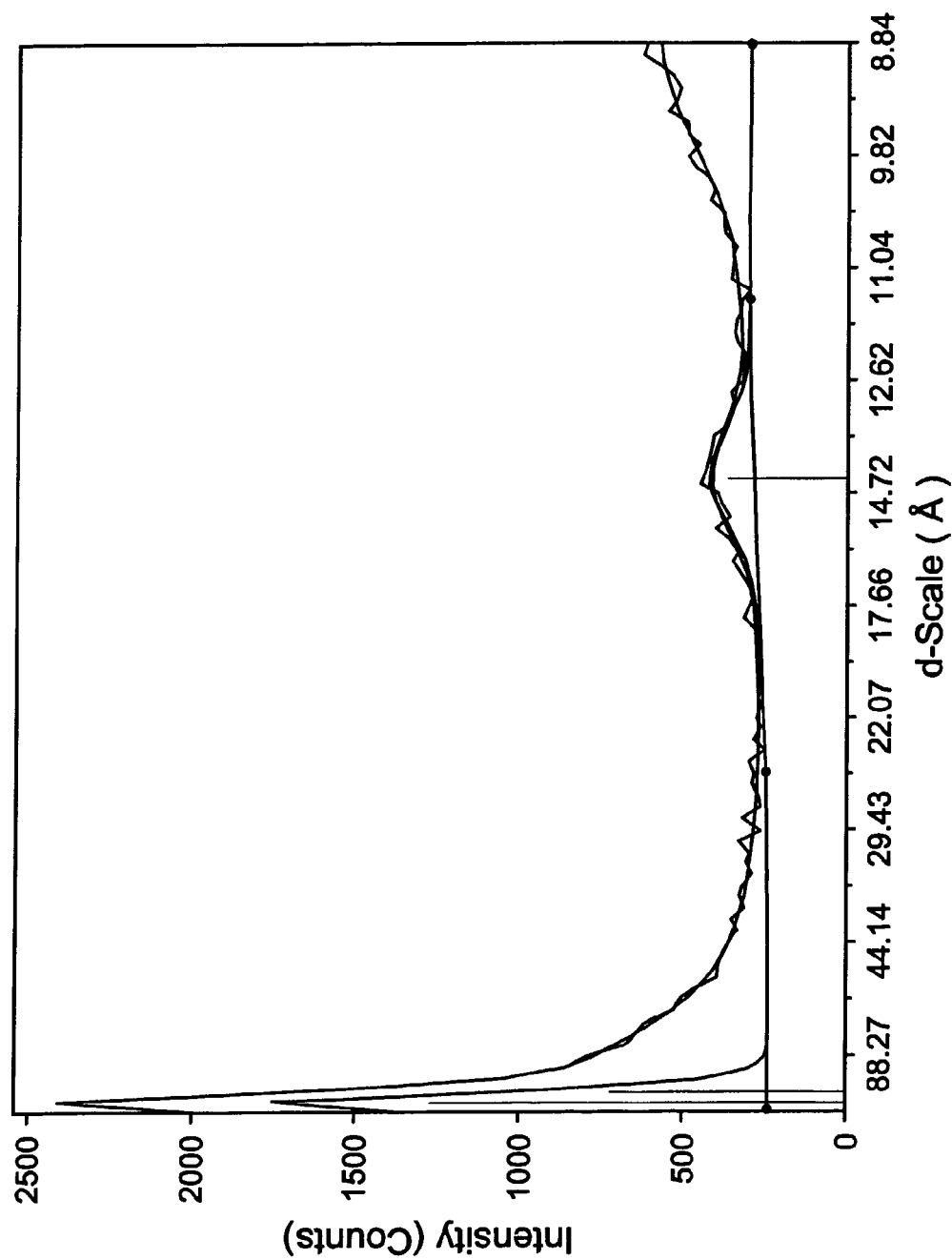
FIG. 6 shows a d-spacing graph of the modified clay from example 10.

X-Ray testing proceeded according to the following description. X-ray data was collected on two different goniometer configurations. A D/MAX Rapid 2-dimensional detector microdiffraction system, with SAXS beam stop and point source was used for one set of data, and an Ultima III line source system with SAXS attachment in parallel beam mode was used for the second set of data. The intensity versus d-spacing plots shown in FIGS. 1-6 are from the parallel beam point source with SAXS attachment instrument. For this data, the sample was prepared by cutting various sections at different angles with respect to the sample surface in order to decrease effects of preferred orientation, and the parallel beam was used to illuminate the entire sample area. For more information on conducting these and related procedures, please consult the manufacture and operating manual related to the aforementioned equipment.

Elastomer

The nanocomposites of the present invention comprise at least one elastomer along with other components described and claimed herein. In an embodiment, the elastomer may be an interpolymer. The interpolymer may be random elastomeric copolymers of a $C_4$ to $C_7$ isomonoolefins, such as isobutylene and a para-alkylstyrene comonomer, such as para-methylstyrene, containing at least 80%, more alternatively at least 90% by weight of the para-isomer and optionally include functionalized interpolymers wherein at least one or more of the alkyl substituent groups present in the styrene monomer units contain benzylic halogen or some other functional group. In another embodiment, the interpolymer may be a random elastomeric copolymer of ethylene or a $C_3$ to $C_6$ α-olefin and a para-alkylstyrene comonomer, such as para-methylstyrene containing at least 80%, alternatively at least 90% by weight of the para-isomer and optionally include functionalized interpolymers wherein at least one or more of the alkyl substituents groups present in the styrene monomer units contain benzylic halogen or some other functional group. Exemplary materials may be characterized as interpolymers containing the following monomer units randomly spaced along the polymer chain:

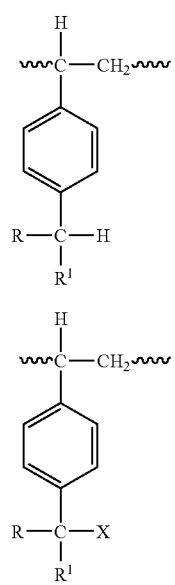

wherein R and $R^1$ are independently hydrogen, lower alkyl, such as a $C_1$ to $C_7$ alkyl and primary or secondary alkyl halides and X is a functional group such as halogen. In an embodiment, R and $R^1$ are each hydrogen. Up to 60 mol % of the para-substituted styrene present in the interpolymer structure may be the functionalized structure (1) above in one embodiment, and in another embodiment from 0.1 to 5 mol % of the total monomer units. In yet another embodiment, the amount of functionalized structure (2) is from 0.4 to 2.5 mol % of the total monomer units.

The functional group X may be halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers, their method of preparation, methods of functionalization, and curing methods are more particularly disclosed in U.S. Pat. No. 5,162,445.

In an embodiment, the elastomer comprises interpolymers of isobutylene and para-methylstyrene containing from 0.5 to 20 mol % para-methylstyrene wherein up to 60 mol % of the methyl substituent groups present on the benzyl ring contain a bromine or chlorine atom, such as a bromine atom (para-(bromomethylstyrene)), as well as acid or ester functionalized versions thereof.

In another embodiment, the functionality is selected such that it can react or form polar bonds with functional groups present in the matrix polymer, for example, acid, amino or hydroxyl functional groups, when the polymer components are mixed at high temperatures.

In certain embodiments, the interpolymers have a substantially homogeneous compositional distribution such that at least 95% by weight of the polymer has a para-alkylstyrene moiety with 10% of the average para-alkylstyrene content of the polymer. Exemplary interpolymers are characterized by a narrow molecular weight distribution (Mw/Mn) of less than 5, alternatively less than 2.5, and an exemplary number average molecular weight in the range of from 25,000 to 750,000 as determined by gel permeation chromatography.

The elastomer such as the interpolymer discussed above may be prepared by a slurry polymerization, typically in a diluent comprising a halogenated hydrocarbon(s) such as a chlorinated hydrocarbon and/or a fluorinated hydrocarbon including mixtures thereof, (see, e.g., WO 2004/058828, WO 2004/058827, WO 2004/058835, WO 2004/058836, WO 2004/058825, PCT/US03/41221 and WO 2004/058829), of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional moiety.

In an embodiment, brominated poly(isobutylene-co-p-methylstyrene) "BIMS" polymers generally contain from 0.1 to 5% mole of bromomethylstyrene groups relative to the total amount of monomer derived units in the polymer. In another embodiment, the amount of bromomethyl groups is from 0.2 to 3.0 mol %, and from 0.3 to 2.8 mol % in yet another embodiment, and from 0.4 to 2.5 mol % in yet another embodiment, and from 0.3 to 2.0 in yet another embodiment, wherein a desirable range may be any combination of any upper limit with any lower limit. Expressed another way, exemplary copolymers contain from 0.2 to 10 wt % of bromine, based on the weight of the polymer, from 0.4 to 6 wt % bromine in another embodiment, and from 0.6 to 5.6 wt % in another embodiment, are substantially free of ring halogen or halogen in the polymer backbone chain. In one embodiment, the interpolymer is a copolymer of $C_4$ to $C_7$ isoolefin derived units (or isomonoolefin), para-methylstyrene derived units and para-(halomethylstyrene) derived units, wherein the para-(halomethylstyrene) units are present in the interpolymer from 0.4 to 3.0 mol % based on the total number of para-methylstyrene, and wherein the para-methylstyrene derived units are present from 2 wt % to 25 wt % based on the total weight of the polymer in one embodiment, and from 4 wt % to 15 wt % in another embodiment. In another embodiment, the para-(halomethylstyrene) is para-(bromomethylstyrene).

In yet another embodiment, the elastomer may comprise a halogenated butyl rubber component, either with the interpolymer or as the only elastomer combined with the exfoliated clay. In one embodiment of the invention, the halogenated rubber component is a halogenated copolymer of a $C_4$ to $C_6$ isoolefin and a multiolefin. In another embodiment, the halogenated rubber component is a blend of a polydiene or block copolymer, and a copolymer of a $C_4$ to $C_6$ isoolefin and a conjugated, or a "star-branched" butyl polymer. The halogenated butyl polymer useful in the present invention can thus be described as a halogenated elastomer comprising $C_4$ to $C_7$ isoolefin derived units, multiolefin derived units, and halogenated multiolefin derived units, and includes both "halogenated butyl rubber" and so called "halogenated star-branched" butyl rubber.

In one embodiment, the halogenated butyl rubber is brominated butyl rubber, and in another embodiment is chlorinated butyl rubber. General properties and processing of halogenated butyl rubbers is described in THE VANDERBILT RUBBER HANDBOOK 105-122 (Robert F. Ohm ed., R.T. Vanderbilt Co., Inc. 1990), and in RUBBER TECHNOLOGY 311-321 (Maurice Morton ed., Chapman & Hall 1995). Butyl rubbers, halogenated butyl rubbers, and star-branched butyl rubbers are described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

The halogenated rubber component of the present invention includes, but is not limited to, brominated butyl rubber, chlorinated butyl rubber, star-branched polyisobutylene rubber, star-branched brominated butyl (polyisobutylene/isoprene copolymer) rubber; isobutylene-bromomethylstyrene copolymers such as isobutylene/meta-bromomethylstyrene, isobutylene/para-bromomethylstyrene, isobutylene/chloromethylstyrene, halogenated isobutylene cyclopentadiene, and isobutylene/para-chloromethylstyrene, and the like halomethylated aromatic interpolymers as in U.S. Pat. No. 4,074,035 and U.S. Pat. No. 4,395,506; isoprene and halogenated isobutylene copolymers, polychloroprene, and the like, and mixtures of any of the above. Some embodiments of the halogenated rubber component are also described in U.S. Pat. Nos. 4,703,091 and 4,632,963.

More particularly, in one embodiment, the elastomer comprises a halogenated butyl rubber. As used herein, "halogenated butyl rubber" refers to both butyl rubber and so-called "star-branched" butyl rubber, described below. The halogenated butyl rubber is produced from the halogenation of butyl rubber. For example, the olefin polymerization feeds employed in producing the halogenated butyl rubber of the invention are those olefinic compounds conventionally used in the preparation of butyl-type rubber polymers. The butyl polymers are prepared by reacting a comonomer mixture, the mixture having at least (1) a $C_4$ to $C_6$ isoolefin monomer component such as isobutylene with (2) a multiolefin, or conjugated diene, monomer component. The isoolefin is in a range from 70 to 99.5 wt % by weight of the total comonomer mixture in one embodiment, and 85 to 99.5 wt % in another embodiment. The conjugated diene component in one embodiment is present in the comonomer mixture from 30 to 0.5 wt % in one embodiment, and from 15 to 0.5 wt % in another embodiment. In yet another embodiment, from 8 to 0.5 wt % of the comonomer mixture is conjugated diene.

The isoolefin is a $C_4$ to $C_6$ compound such as isobutylene, isobutene 2-methyl-1-butene, 3-methyl-1-butene, 2-methyl-2-butene, and 4-methyl-1-pentene. The multiolefin is a $C_4$ to $C_{14}$ conjugated diene such as isoprene, butadiene, 2,3-dimethyl-1,3-butadiene, myrcene, 6,6-dimethyl-fulvene, cyclopentadiene, hexadiene and piperylene. One embodiment of the butyl rubber polymer of the invention is obtained by reacting 92 to 99.5 wt % of isobutylene with 0.5 to 8 wt % isoprene, or reacting 95 to 99.5 wt % isobutylene with from 0.5 wt % to 5.0 wt % isoprene in yet another embodiment.

Halogenated butyl rubber is produced by the halogenation of the butyl rubber product described above. Halogenation can be carried out by any means, and the invention is not herein limited by the halogenation process. Methods of halogenating polymers such as butyl polymers are disclosed in U.S. Pat. Nos. 2,631,984, 3,099,644, 4,554,326, 4,681,921, 4,650,831, 4,384,072, 4,513,116 and 5,681,901. In one embodiment, the halogen is in the so called II and III structures as discussed in, for example, RUBBER TECHNOLOGY at 298-299 (1995). In one embodiment, the butyl rubber is halogenated in hexane diluent at from 40 to 60° C. using bromine ($Br_2$) or chlorine ($Cl_2$) as the halogenation agent. The halogenated butyl rubber has a Mooney Viscosity of from 20 to 70 (ML 1+8 at 125° C.) in one embodiment, and from 25 to 55 in another embodiment. The halogen wt % is from 0.1 to 10 wt % based in on the weight of the halogenated butyl rubber in one embodiment, and from 0.5 to 5 wt % in another embodiment. In yet another embodiment, the halogen wt % of the halogenated butyl rubber is from 1 to 2.2 wt %.

In another embodiment, the halogenated butyl or star-branched butyl rubber may be halogenated such that the halogenation is in the primary allylic position. This is typically achieved by such means as free radical bromination or free radical chlorination, or by such methods as secondary treatment halogenated rubbers, such as by heating the rubber, to form the allylic halogenated butyl and star-branched butyl rubber. Common methods of forming the allylic halogenated polymer are disclosed by in U.S. Pat. Nos. 4,632,963, 4,649,178, and 4,703,091. Thus, in one embodiment of the invention, the halogenated butyl rubber is such that the halogenated multiolefin units are primary allylic halogenated units, and wherein the primary allylic configuration is present to at least 20 mol % (relative to the total amount of halogenated multiolefin) in one embodiment, and at least 30 mol % in another embodiment. This arrangement can be described as follows (3), wherein X is a halogen, desirably chlorine or bromine, and q is at least 60 mol % based on the total moles of halogen in one embodiment, and at least 30 mole % in another embodiment, and from 25 mol % to 90 mol % in yet another embodiment:

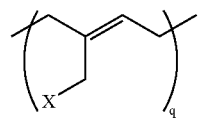

(3)

A commercial embodiment of the halogenated butyl rubber of the present invention is Bromobutyl 2222 (ExxonMobil Chemical Company, Baytown, Tex.). Its Mooney Viscosity is from 27 to 37 (ML 1+8 at 125° C., ASTM 1646), and the bromine content is from 1.8 to 2.2 wt % relative to the Bromobutyl 2222. Further, cure characteristics of Bromobutyl 2222 are as follows: MH is from 28 to 40 dN·m, ML is from 7 to 18 dN·m (ASTM D2084, modified). Another commercial embodiment of the halogenated butyl rubber is Bromobutyl 2255 (ExxonMobil Chemical Company). Its Mooney Viscosity is from 41 to 51 (ML 1+8 at 125° C., ASTM 1646, modified), and the bromine content is from 1.8 to 2.2 wt %. Further, cure characteristics of Bromobutyl 2255 are as follows: MH is from 34 to 48 dN·m, ML is from 11 to 21 dN·m (ASTM D2084, modified). The invention is not limited to the commercial source of any of the halogenated rubber components or to the characterization described above.

In another embodiment, the elastomer may comprise a branched or "star-branched" halogenated butyl rubber. In one embodiment, the star-branched halogenated butyl rubber ("SBHR") is a composition of a butyl rubber, either halogenated or not, and a polydiene or block copolymer, either halogenated or not. The halogenation process is described in detail in U.S. Pat. Nos. 4,074,035, 5,071,913, 5,286,804, 5,182,333 and 6,228,978. The invention is not limited by the method of forming the SBHR. The polydienes/block copolymer, or branching agents (hereinafter "polydienes"), are typically cationically reactive and are present during the polymerization of the butyl or halogenated butyl rubber, or can be blended with the butyl or halogenated butyl rubber to form the SBHR. The branching agent or polydiene can be any suitable branching agent, and the invention is not limited to the type of polydiene used to make the SBHR.

In one embodiment, the SBHR is typically a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, ethylene-propylene diene rubber, styrene-butadiene-styrene and styrene-isoprene-styrene block copolymers. In certain embodiments, the polydienes are present from 0.3 to 3 wt %, greater than 0.3 wt % in another embodiment, and in yet another embodiment, from 0.4 to 2.7 wt % based upon the amount of monomer present in the polymer.

A commercial embodiment of the SBHR of the present invention is Bromobutyl 6222 (ExxonMobil Chemical Company, Baytown, Tex.), having a Mooney Viscosity (ML 1+8 at 125° C., ASTM 1646, modified) of from 27 to 37, and a bromine content of from 2.2 to 2.6 wt % relative to the SBHR. Further, cure characteristics of Bromobutyl 6222 are as follows: MH is from 24 to 38 dN·m, ML is from 6 to 16 dN·m (ASTM D2084, modified).

In certain embodiments, the halogenated rubber component is present in a blend of from 10 to 90 phr in one embodiment, from 20 to 80 phr in another embodiment, and from 30 to 70 phr in yet another embodiment, wherein a desirable range may be any combination of any upper phr limit with any lower phr limit.

The aforementioned polymers are commonly referred to as isobutylene-based polymers. In certain embodiments, the elastomer comprises an isobutylene-based polymer. Some of the elastomers below are also isobutylene-based polymers according the definition provided herein.

In another embodiment, the elastomer may also comprise a "general purpose rubber."

In yet another embodiment, the elastomer may comprise natural rubbers, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene), such as, for example, terpolymers of isobutylene derived units, p-methylstyrene derived units, and p-bromomethylstyrene derived units, and mixtures thereof.

In another embodiment, the elastomer may also comprise a natural rubber. Natural rubbers are described in detail by Subramaniam in RUBBER TECHNOLOGY 179-208 (Maurice Morton, Chapman & Hall 1995). Desirable embodiments of the natural rubbers of the present invention are selected from Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

In another embodiment, the elastomer may also comprise a polybutadiene (BR) rubber. The Mooney viscosity of the polybutadiene rubber as measured at 100° C. (ML 1+4) may range from 35 to 70, from 40 to about 65 in another embodiment, and from 45 to 60 in yet another embodiment. Some commercial examples of these synthetic rubbers useful in the present invention are NATSYN™ (Goodyear Chemical Company), and BUDENE™ 1207 or BR 1207 (Goodyear Chemical Company). An example is high cis-polybutadiene (cis-BR). By "cis-polybutadiene" or "high cis-polybutadiene", it is meant that 1,4-cis polybutadiene is used, wherein the amount of cis component is at least 95%. A particular example of high cis-polybutadiene commercial products used in the composition BUDENE™ 1207.

In another embodiment, the elastomer may also comprise rubbers of ethylene and propylene derived units such as EPM and EPDM are also suitable as additional rubbers. Examples of suitable comonomers in making EPDM are ethylidene norbornene, 1,4-hexadiene, dicyclopentadiene, as well as others. These rubbers are described in RUBBERTECHNOLOGY 260-283 (1995). A suitable ethylene-propylene rubber is commercially available as VISTALON™ (ExxonMobil Chemical Company, Baytown, Tex.).

In another embodiment, the elastomer may also comprise a halogenated rubber as part of the terpolymer composition.

General properties and processing of halogenated rubbers are described in, for example, THE VANDERBILT RUBBER HANDBOOK 105-122 (Robert F. Ohm ed., R.T. Vanderbilt Co., Inc. 1990), and in RUBBER TECHNOLOGY 311-321 (1995). Butyl rubbers, halogenated butyl rubbers, and star-branched butyl rubbers are described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

In certain embodiments, the elastomer may also comprise at least one or more of brominated butyl rubber, chlorinated butyl rubber, star-branched polyisobutylene rubber, star-branched brominated butyl(polyisobutylene/isoprene copolymer) rubber; halogenated poly(isobutylene-co-p-methylstyrene), such as, for example, terpolymers of isobutylene derived units, p-methylstyrene derived units, and p-bromomethylstyrene derived units (BrIBMS), and the like halomethylated aromatic interpolymers as in U.S. Pat. Nos. 5,162,445; 4,074,035; and 4,395,506; halogenated isoprene and halogenated isobutylene copolymers, polychloroprene, and the like, and mixtures of any of the above. Some embodiments of the halogenated rubber component are also described in U.S. Pat. Nos. 4,703,091 and 4,632,963.

In another embodiment, the elastomer may comprise a so called semi-crystalline copolymer ("SCC"). Semi-crystalline copolymers are described in WO 00/69966. Generally, the SCC is a copolymer of ethylene or propylene derived units and α-olefin derived units, the α-olefin having from 4 to 16 carbon atoms in one embodiment, and in another embodiment the SCC is a copolymer of ethylene derived units and α-olefin derived units, the α-olefin having from 4 to 10 carbon atoms, wherein the SCC has some degree of crystallinity. In a further embodiment, the SCC is a copolymer of 1-butene derived units and another α-olefin derived unit, the other α-olefin having from 5 to 16 carbon atoms, wherein the SCC also has some degree of crystallinity. The SCC can also be a copolymer of ethylene and styrene.

The elastomer may be present in the nanocomposite in a range from up to 90 phr in one embodiment, from up to 50 phr in another embodiment, from up to 40 phr in another embodiment, and from up to 30 phr in yet another embodiment. In yet another embodiment, the elastomer may be present from at least 2 phr, and from at least 5 phr in another embodiment, and from at least 5 phr in yet another embodiment, and from at least 10 phr in yet another embodiment. A desirable embodiment may include any combination of any upper phr limit and any lower phr limit.

For example, the elastomer, either individually or as a blend of rubbers such as, for example NR and BR, may be present from 5 phr to 90 phr in one embodiment, and from 10 to 80 phr in another embodiment, and from 30 to 70 phr in yet another embodiment, and from 40 to 60 phr in yet another embodiment, and from 5 to 50 phr in yet another embodiment, and from 5 to 40 phr in yet another embodiment, and from 20 to 60 phr in yet another embodiment, and from 20 to 50 phr in yet another embodiment, the chosen embodiment depending upon the desired end use application of the composition.

The polymer component of the nanocomposites of the present invention may comprises at least one elastomer as described in any of the above elastomers or may comprise any combination of at least two or more of the elastomers described above. In an embodiment, the elastomer comprises an at least one isobutylene-based polymer. In another embodiment, the elastomer comprises at least one isobutylene-based polymer and at least one other rubber. In yet another embodiment, the elastomer comprises at least two or more isobutylene-based polymers.

Modified Layered Filler

Nanocomposites may include at least one elastomer as described above and at least one modified layered filler. The modified layered filler may be produced by the process comprising contacting at least one layered filler such as at least one layered clay with at least one modifying agent.

The modified layered filler may be produced by methods and using equipment well within the skill in the art. For example, see U.S. Pat. Nos. 4,569,923, 5,663,111, 6,036,765, and 6,787,592. Illustrations of such methods are demonstrated in the Example section. However, by no means is this meant to be an exhaustive listing.

In an embodiment, the layered filler such as a layered clay may comprise at least one silicate.

In certain embodiments, the silicate may comprise at least one "smectite" or "smectite-type clay" referring to the general class of clay minerals with expanding crystal lattices. For example, this may include the dioctahedral smectites which consist of montmorillonite, beidellite, and nontronite, and the trioctahedral smectites, which includes saponite, hectorite, and sauconite. Also encompassed are smectite-clays prepared synthetically, e.g., by hydrothermal processes as disclosed in U.S. Pat. Nos. 3,252,757, 3,586,468, 3,666,407, 3,671,190, 3,844,978, 3,844,979, 3,852,405, and 3,855,147.

In yet other embodiments, the at least one silicate may comprise natural or synthetic phyllosilicates, such as montmorillonite, nontronite, beidellite, bentonite, volkonskoite, laponite, hectorite, saponite, sauconite, magadite, kenyaite, stevensite and the like, as well as vermiculite, halloysite, aluminate oxides, hydrotalcite, and the like. Combinations of any of the previous embodiments are also contemplated.

The layered filler such as the layered clays described above may be modified such as intercalated or exfoliated by treatment with at least one modifying agent or swelling agent or exfoliating agent or additive capable of undergoing ion exchange reactions with the cations present at the interlayer surfaces of the layered filler.

Suitable modifying agents may comprise at least one polymer chain comprising a carbon chain length of from $C_{25}$ to $C_{500}$, wherein the polymer chain also comprises an ammonium-functionalized group described by the following group pendant to the polymer chain E:

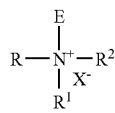

wherein each R, $R^1$ and $R^2$ are the same or different and independently selected from hydrogen, $C_1$ to $C_{26}$ alkyl, alkenes or aryls, substituted $C_1$ to $C_{26}$ alkyls, alkenes or aryls, $C_1$ to $C_{26}$ aliphatic alcohols or ethers, $C_1$ to $C_{26}$ carboxylic acids, nitriles, ethoxylated amines, acrylates and esters; and wherein X is a counterion of ammonium such as $Br^-$, $Cl^-$ or $PF_6^-$.

The modifying agent may also comprise at least one additional agent capable of undergoing ion exchange reactions with the cations present at the interlayer surfaces of the layered filler. Additional agents include at least one cationic surfactant such as ammonium ion, alkylamines or alkylammonium ion (primary, secondary, tertiary and quaternary), phosphonium or sulfonium derivatives of aliphatic, aromatic or arylaliphatic amines, phosphines and sulfides, and the like.

In other embodiments, the polymer chain may comprise a carbon chain length of from $C_{30}$ to $C_{400}$, preferably $C_{30}$ to $C_{300}$, and even more preferably $C_{30}$ to $C_{200}$.

In another embodiment, the polymer chain may comprise a carbon chain length of from $C_{40}$ to $C_{400}$, preferably $C_{50}$ to $C_{300}$, and even more preferably $C_{60}$ to $C_{200}$.

In a preferred embodiment, the polymer chain may comprise a carbon chain length of from $C_{25}$ to $C_{500}$ made from $C_4$ to $C_7$ isoolefins such as isobutylene.

In an embodiment, the polymer chain comprises isobutylene derived units with the ammonium-functionalized group as described above. In another embodiment, the polymer chain may consist essentially of poly(isobutylene) with the ammonium-functionalized group as described above. In yet another embodiment, the modifying agent may comprise at least one end-functionalized polyisobutylene amine.

In other embodiments, the polymer chain may comprise monomers including linear, branched or cyclic alpha-olefins, such as $C_3$ to $C_{20}$ alpha-olefins, $C_3$ to $C_{10}$ alpha-olefins, $C_3$ to $C_8$ alpha-olefins, or $C_4$ to $C_6$ alpha-olefins. Example include and may be one or more of butylene, pentene, hexene, heptene, octene, nonene, decene, dodecene, 4-methyl-pentene-1, 3-methyl pentene-1,3,5,5-trimethyl hexene 1, and 5-ethyl-1-nonene. In a particularly preferred embodiment, the polymer chain comprises isobutylene with the ammonium-functionalized group as described above.

The polymer chain may also include monomers such as styrenics and/or substituted styrenics and vinyl ethers. The styrenic may be substituted (on the ring) with an alkyl, aryl, halide or alkoxide group. Preferably, the monomer contains 2 to 20 carbon atoms, more preferably 2 to 9, even more preferably 3 to 9 carbon atoms. Examples include styrene, para-alkylstyrene, para-methylstyrene, alpha-methyl styrene, divinylbenzene, diisopropenylbenzene, isobutylene, 2-methyl-1-butene, 3-methyl-1-butene, 2-methyl-2-pentene, isoprene, butadiene, 2,3-dimethyl-1,3-butadiene, 13-pinene, myrcene, 6,6-dimethyl-fulvene, hexadiene, cyclopentadiene, piperylene, methyl vinyl ether, ethyl vinyl ether, and isobutyl vinyl ether and the like.

In another embodiment, the polymer chain may comprise one or more linear or branched $C_3$ to $C_{30}$ prochiral alpha-olefins or $C_5$ to $C_{30}$ ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

In other embodiments, the polymer chain may comprise monomers including aromatic-group-containing monomers containing up to 30 carbon atoms. Suitable aromatic-group-containing monomers comprise at least one aromatic structure, preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene and allyl benzene.

In still other embodiments, the polymer chain may comprise monomers including non aromatic cyclic group containing monomers. For example, these monomers can contain up to 20 carbon atoms. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, $C_1$ to $C_{10}$ alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane, norbornene, and the like.

In another embodiment, the polymer chain may comprise monomers including diolefin monomers useful including any hydrocarbon structure, such as $C_4$ to $C_{20}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In yet another embodiment, the polymer chain may include polar unsaturated monomers including 6-nitro-1-hexene, N-methylallylamine, N-allylcyclopentylamine, N-allylhexylamine, methyl vinyl ketone, ethyl vinyl ketone, 5-hexen-2-one, 2-acetyl-5-norbornene, 7-syn methoxymethyl-5-norbornen-2-one, acrolein, 2,2-dimethyl-4-pentenal, undecylenic aldehyde, 2,4-dimethyl-2,6-heptadienal, acrylic acid, vinylacetic acid, 4-pentenoic acid, 2,2-dimethyl-4-pentenoic acid, 6-heptenoic acid, trans-2,4-pentadienoic acid, 2,6-heptadienoic acid, nona-fluoro-1-hexene, allyl alcohol, 7-octene-1,2-diol, 2-methyl-3-buten-1-ol, 5-norbornene-2-carbonitrile, 5-norbornene-2-carboxaldehyde, 5-norbornene-2-carboxylic acid, cis-5-norbornene-endo-2,3-dicarboxylic acid, 5-norbornene-2,2,-dimethanol, cis-5-norbornene-endo-2,3-dicarboxylic anhydride, 5-norbornene-2-endo-3-endo-dimethanol, 5-norbornene-2-endo-3-exo-dimethanol, 5-norbornene-2-methanol, 5-norbornene-2-ol, 5-norbornene-2-yl acetate, 1-[2-(5-norbornene-2-yl)ethyl]-3,5,7,9,11,13,15-heptacyclopentylpentacyclo[9.5.1.1$^{39}$.1$^{5,15}$.1$^{7,13}$] octasiloxane, 2-benzoyl-5-norbornene, allyl 1,1,2,2,-tetrafluoroethyl ether, acrolein dimethyl acetal, butadiene monoxide, 1,2-epoxy-7-octene, 1,2-epoxy-9-decene, 1,2-epoxy-5-hexene, 2-methyl-2-vinyloxirane, allyl glycidyl ether, 2,5-dihydrofuran, 2-cyclopenten-1-one ethylene acetal, allyl disulfide, ethyl acrylate, and methyl acrylate.

In yet other embodiments, the polymer chain may comprise homopolymers or copolymers. Preferred polymers include homopolymers or copolymers of any combination of one or more monomers as described above. Particularly preferred monomer combinations include 1) isobutylene and para-methyl styrene; 2) isobutylene and isoprene; and 3) homopolymers of isobutylene.

The polymer chain may also comprise random or block copolymers. Preferred block copolymers include copolymers of styrenics, such as styrene, para-methylstyrene, alpha-methylstyrene, and $C_4$ to $C_{30}$ diolefins, such as isoprene, butadiene, and the like.

In another preferred embodiment, the polymer chain does not comprise propylene derived units.

In any of the previous embodiments, the ammonium-functionalized group as described above comprises an ammonium salt including at least one onium, quaternary ammonium, or tertiary ammonium salt.

In any of the previous embodiments, the ammonium-functionalized group as described above comprises at least one counterion of ammonium salt including Br⁻ or Cl⁻.

In certain embodiments, the modified layered filler generally comprise particles containing a plurality of layered platelets having a thickness of 8-12 Å tightly bound together, and contain exchangeable cations such as $Na^+$, $Ca^{+2}$, $K^+$ or $Mg^{+2}$ present at the interlayer surfaces.

In an embodiment, for example, the modifying agent may be added to the composition at any stage; for example, the modifying agent may be added to the elastomer, followed by addition of the layered filler, or may be added to a combination of at least one elastomer and at least one layered filler; or the modifying agent may be first blended with the layered filler, followed by addition of the elastomer in yet another embodiment.

In certain embodiments, the modifying agent such as described herein is present in the composition in an amount to achieve optimal air retention as measured by the permeability testing described herein. For example, the agent may be present from 0.1 to 40 phr in one embodiment, and from 0.2 to 20 phr in yet another embodiment, and from 0.3 to 10 phr in another embodiment.

In certain embodiments, the spacing of the layered platelets, as shown, for example, through d-spacing, is improved. Such improvements provide for desirable intercalation or exfoliation that ultimately, when mixed with elastomers to produce a finished nanocomposite results, for example, in improved barrier properties for articles such as innerliner applications.

In certain embodiments, treatment with the modifying agents described above results in intercalation or exfoliation of the layered platelets of the layered fillers as a consequence of a reduction of the ionic forces holding the layered platelets together and introduction of molecules between the layered platelets which serve to space the layered platelets at distances, for example, of greater than 4 Å, alternatively greater than 10 Å.

In other embodiments, the modified layered filler may comprise two or more layers having d-spacing of 30 Å or greater, alternatively, comprise two or more layers having d-spacing of 35 Å or greater; alternatively, comprise two or more layers having d-spacing of 40 Å or greater; alternatively, comprise two or more layers having d-spacing of 50 Å or greater; alternatively, comprise two or more layers having d-spacing of 75 Å or greater; and alternatively, comprise two or more layers having d-spacing of 80 Å or greater.

In certain embodiments, this separation allows the modified layered filler to more readily sorb polymerizable monomer material and polymeric material between the layers and facilitates further delamination of the layered platelets when the intercalate or exfoliate is shear mixed with matrix polymer material to provide a high degree of dispersion of the modified layered filler within the polymer matrix.

In certain embodiments, layered filler is pre-exchanged with above intercalant. The exchanging reaction take places in a solvent system and aided by mixing or heating. The exchanged filler is then separated from solvent and dried for use in preparation of nanocomposite. The increased d-spacing and weight gain before and after exchanging indicates the formation of modified clay.

Nanocomposite Processing

The nanocomposites may be produced using methods and equipment known in the art, for example, including but not limited to melt mixing and solution blending. In general, at least one modified layered filler as described above is contacted, regardless of the process employed, with at least one elastomer, and, in other embodiments, blends of elastomers, to produce nanocomposites as illustrated below, for example, where the symbol "Δ" denotes heating.

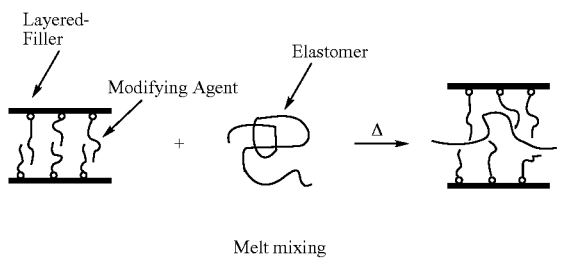

Melt mixing

Blending of the components may be carried out by combining the elastomer and other optional components and the modified layered filler in any suitable mixing device such as a Banbury™ mixer, Brabender™ mixer or preferably a mixer/extruder and mixing at temperatures, for example, in the range of 120° C. up to 300° C. under conditions of shear sufficient to allow the components to disperse to a desired uniformity to form a nanocomposite. (See, e.g., U.S. Pat. Nos. 6,034,164, 6,060,549, WO 02/48257, and WO 02/100923).

Solution Blending

The nanocomposites of the present invention may also be produced by solution processes. In certain embodiments, the solution process may be included with in situ production of the nanocomposite composition. In an embodiment, the process may comprise contacting at least one elastomer and at least one layered filler, such as the layered filler as described above, in a solution comprising at least one solvent. Standard methods and equipment for both lab and large-scale production, including batch and continuous processes may be used to produce the polymeric nanocomposites of the invention.

Suitable solvents include hydrocarbons such as alkanes, including $C_4$ to $C_{22}$ linear, cyclic, branched alkanes, alkenes, aromatics, and mixtures thereof. Examples include propane, isobutane, pentane, methycyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,24,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcycopentane, c is 1,2-dimethylcyclopentane, trans-1,2-dimethylcyclopentane, trans-1,3-dimethylcyclopentane, ethylcyclopentane, cyclohexane, methylcyclohexane, benzene, toluene, xylene, ortho-xylene, para-xylene, meta-xylene, and mixtures thereof.

In an embodiment, the solution comprises at least one hydrocarbon. In another embodiment, the solution consists essentially of at least one hydrocarbon. In yet another embodiment, the solution comprises or consists essentially of two or more hydrocarbons. In other embodiments, the solution may comprise at least one hexane, such as cyclohexane or mixtures of hexanes. Mixtures of hydrocarbons such as mixtures of hexanes are commonly available as lower grade commercial products.

In another embodiment, suitable solvents include one or more nitrated alkanes, including $C_2$ to $C_{22}$ nitrated linear, cyclic or branched alkanes. Nitrated alkanes include, but are not limited to nitromethane, nitroethane, nitropropane, nitrobutane, nitropentane, nitrohexane, nitroheptane, nitrooctane, nitrodecane, nitrononane, nitrododecane, nitroundecane, nitrocyclomethane, nitrocycloethane, nitrocyclopropane, nitrocyclobutane, nitrocyclopentane, nitrocyclohexane, nitrocycloheptane, nitrocyclooctane, nitrocyclodecane, nitrocyclononane, nitrocyclododecane, nitrocycloundecane, nitrobenzene, and the di- and tri-nitro versions of the above, and mixtures thereof.

Halogenated versions of all of the above may also be used such as chlorinated hydrocarbons, for example, methyl chloride, methylene chloride, ethyl chloride, propyl chloride, butyl chloride, chloroform, and mixtures thereof.

Hydrofluorocarbons may also be used, for example, fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3, 3-heptafluorobutane; 1,1,1,2,2,4,4-heptafluorobutane; 1,1,1, 2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2, 3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,3,3-trifluoro-2-methylpropane; 1,3-difluoro-2-(fluoromethyl) propane; 1,1,1,3-tetrafluoro-2-methylpropane; 1,1,3,3-tetrafluoro-2-methylpropane; 1,3,3-trifluoro-2-(fluoromethyl)propane; 1,1,1,3,3-pentafluoro-2-methylpropane; 1,1,3,3-tetrafluoro-2-(fluoromethyl) propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3 trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3, 4-hexafluorocyclobutane; 1,1,2,3,3,4-hexafluorocyclobutane; 1,1,2,2,3,3,4-heptafluorocyclobutane; and mixtures thereof.

In certain embodiments, unsaturated hydrofluorocarbons may also be used.

In another embodiment, suitable solvents include at least one oxygenate, including $C_1$ to $C_{22}$ alcohols, ketones, ethers, carboxylic acids, esters, and mixtures thereof.

Alcohols include, but not limited to, methanol, ethanol, 1-propanol, 2-propanol, 1-butanol, 2-butanol, 2-methyl-2-propanol, 2-methyl-1-propanol, 1-petanol, 2-petanol, 3-petanol, 2-methyl-1-butanol, 3-methyl-1-butanol, 3-methyl-2-butanol, t-amyl alcohol, 1-hexanol, 2-hexanol, 3-hexanol, 2-methyl-1-pentanol, 2-methyl-2-pentanol, 2-methyl-3-pentanol, 3-methyl-1-pentanol, 3-methyl-2-pentanol, 3-methyl-3-pentanol, 4-methyl-1-pentanol, 3-methyl-2-pentanol, 2,3-dimethyl-2-butanol, 3,3-dimethyl-1-butanol, 3,3-dimethyl-2-butanol, 1-heptanol, 2-heptanol, 3-heptanol, 2-methyl-2-hexanol, 2-methyl-3-hexanol, 5-methyl-1-hexanol, 5-methyl-2-hexanol, 2,2-dimethyl-3-pentanol, 2,3-dimethyl-3-pentanol, 2,4-dimethyl-3-pentanol, 4,4-dimethyl-2-pentanol, 3-ethyl-3-petanol, 1-octanol, 2-octanol, 3-octanol, 4-methyl-3-heptanol, 6-methyl-2-heptanol, 2-ethyl-1-hexanol, 2-propyl-1-pentanol, 2,4,4-trimethyl-1-pentanol, and mixtures thereof.

Ketones include, but not limited to acetone, 2-butanone, 2-pentanone, 3-pentanone, 3-methyl-2-butanone, 2-hexanone, 3-hexanone, 2-methyl-3-pentanone, 3-methyl-2-pentanone, 4-methyl-2-pentanone, 2-hepanone, 3-hepanone, 4-hepanone, 2-methyl-3-hexanone, 5-methyl-2-hexanone, 2,4-dimethyl-3-pentanone, 4,4-dimethyl-2-pentanone, 2-octanone, 3-octanone, 2-methyl-3-heptanone, 5-methyl-3-heptanone, and mixtures thereof.

Ethers include, but not limited to, methyl ether, tetrahydrofuran, butyl methyl ether, sec-butyl methyl ether, tert-butyl methyl ether, butyl ethyl ether, isopropyl ether, tert-amyl methyl ether, tert-butyl ethyl ether, 2,2,5,5-tetramethyltetrahydrofuran, and mixtures thereof.

Acids include, but not limited to, acetic acid, propionic acid, butyric acid, isobutyric acid, valeric acid, isovaleric acid, hexanoic acid, 2,2-dimethylbutyric acid, 2-ethylbutyric acid, 2-methylvaleric acid, 3-methylvaleric acid, 4-methylvaleric acid, heptanoic acid, 2-methylhexanoic acid, octanoic acid, 2-ethylhexanoic acid, 2-propylpentanoic acid, and mixtures thereof.

Esters include, but not limited to, methyl acetate, ethyl formate, ethyl acetate, isopropyl formate, methyl propionate, butyl formate, ethyl propionate, isopropyl acetate, propyl acetate methyl butyrate, methyl isobutyrate, butyl acetate, s-butyl acetate, t-butyl acetate, ethyl butyrate, ethyl isobutyrate, methyl trimethylacetate, methyl valerate, amyl acetate, butyl propionate, t-butyl propionate, ethyl isovalerate, ethyl 2-methylbutyrate, ethyl trimethylacetate, ethyl valerate, isopropyl butyrate, methyl caproate, pentyl acetate, propyl butyrate, butyl butyrate, hexyl acetate, isobutyl isobutyrate, ethyl caproate, and mixtures thereof.

In certain embodiments, a nanocomposite is produced by a process comprising contacting Solution A comprising a solvent comprising a hydrocarbon and at least one layered filler; Solution B comprising a solvent and at least one elastomer; and removing the solvents from the contact product of Solution A and Solution B to form a nanocomposite.

In the previous embodiment, the layered filler may be a layered clay treated with organic molecules as described above.

In yet another embodiment, a nanocomposite is produced by a process comprising contacting at least one elastomer and at least one layered filler in a solvent; and removing the solvent from the contact product to form a nanocomposite.

In another embodiment, a nanocomposite is produced by a process comprising contacting at least one elastomer and at least one layered filler in a solvent mixture comprising two solvents; and removing the solvent mixture from the contact product to form a nanocomposite.

In still another embodiment, a nanocomposite is produced by a process comprising contacting at least one elastomer and at least one layered filler in a solvent mixture comprising at least two or more solvents; and removing the solvent mixture from the contact product to form a nanocomposite.

In another embodiment, a nanocomposite is produced by a process to form a contact product comprising dissolving at least one elastomer and then dispersing at least one layered filler in a solvent or solvent mixture comprising at least two solvents; and removing the solvent mixture from the contact product to form a nanocomposite.

In yet another embodiment, a nanocomposite is produced by a process to form a contact product comprising dispersing at least one layered filler and then dissolving at least one elastomer in a solvent or solvent mixture comprising at least two solvents; and removing the solvent mixture from the contact product to form a nanocomposite.

In the embodiments described above, solvents may be present in the production of the nanocomposite composition from 30 to 99 wt %, alternatively from 40 to 99 wt %, alternatively from 50 to 99 wt %, alternatively from 60 to 99 wt %, alternatively from 70 to 99 wt %, alternatively from 80 to 99 wt %, alternatively from 90 to 99 wt %, alternatively from 95 to 99 wt %, based upon the total wt of the composition.

Additionally, in certain embodiments, when two or more solvents are prepared in the production of the nanocomposite composition, each solvent may comprise from 0.1 to 99.9 vol %, alternatively from 1 to 99 vol %, alternatively from 5 to 95 vol %, and alternatively from 10 to 90 vol %, with the total volume of all solvents present at 100 vol %.

In still another embodiment, the invention provides for a process to improve the air impermeability of an elastomer comprising contacting at least one elastomer, at least one modified layered filler, and a solution to form a nanocomposite; wherein the oxygen transmission rate is 150 mm.cc/[$m^2$.day] at 40° C. or lower as measured on cured nanocomposite compositions or articles as described herein.

Alternatively, the oxygen transmission rate is 150 mm.cc/[$m^2$.day] at 40° C. or lower as measured on cured nanocomposite compounds as described herein; the oxygen transmission rate is 140 mm.cc/[$m^2$.day] at 40° C. or lower as measured on cured nanocomposite compounds as described herein; the oxygen transmission rate is 130 mm.cc/[$m^2$.day] at 40° C. or lower as measured on cured nanocomposite compounds as described herein; the oxygen transmission rate is 120 mm.cc/[m2.day] at 40° C. or lower as measured on cured nanocomposite compounds as described herein; the oxygen transmission rate is 110 mm.cc/[$m^2$.day] at 40° C. or lower as measured on cured nanocomposite compounds as described herein; the oxygen transmission rate is 100 mm.cc/[$m^2$.day] at 40° C. or lower as measured on cured nanocomposite compounds as described herein; or the oxygen transmission rate is 90 mm.cc/[$m^2$.day] at 40° C. or lower as measured on cured nanocomposite compounds as described herein.

Other Components

One or more additional filler components such as, for example, calcium carbonate, silica, clay and other silicates which may or may not be exfoliated, talc, titanium dioxide, and carbon black may also be included. Silica is meant to refer to any type or particle size silica or another silicic acid derivative, or silicic acid, processed by solution, pyrogenic or the like methods and having a surface area, including untreated, precipitated silica, crystalline silica, colloidal silica, aluminum or calcium silicates, fumed silica, and the like.

In one embodiment, the additional filler is carbon black or modified carbon black, and combinations of any of these. In another embodiment, the additional filler may be a blend of carbon black and silica.

Additional fillers for articles such as tire treads and sidewalls is reinforcing grade carbon black present at a level of from 10 to 100 phr of the blend, more preferably from 30 to 80 phr in another embodiment, and from 50 to 80 phr in yet another embodiment. Useful grades of carbon black, as described in RUBBER TECHNOLOGY, 59-85, range from N±10 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires, are N330, N351, N550, N650, N660, and N762. Carbon blacks suitable for innerliners and other air barriers include N550, N660, N650, N762, N990 and Regal 85.

The additional filler may be any size and typically ranging, for example, from about 0.0001 µm to about 100 µm.

In certain embodiments, the compositions described herein and the articles made from those compositions may comprise at least one curative package. As used herein, at least one curative package refers to any material or method capable of imparting cured properties to a rubber as commonly understood in the industry. At least one curative package may include any of the following.

One or more crosslinking agents, such as a coupling agent, may also be used, especially when silica is present in combination. The coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyl-trimethoxysilane, gamma-amino-propyl triethoxysilane (sold commercially as A100 by Witco), gamma-mercapto-propyltrimethoxysilane (A189 by Witco) and the like, and mixtures thereof. In one embodiment, bis-(3-triethoxysilypropyl)tetrasulfide (sold commercially as "Si69") is employed.

Generally, polymer blends, for example, those used to produce tires, are crosslinked. It is known that the physical properties, performance characteristics, and durability of vulcanized rubber compounds are directly related to the number (crosslink density) and type of crosslinks formed during the vulcanization reaction. (See, e.g., Helt et al., *The Post Vulcanization Stabilization for NR* in RUBBER WORLD, 18-23 (1991)). Generally, polymer blends may be crosslinked by adding curative molecules, for example sulfur, metal oxides, organometallic compounds, radical initiators, etc., followed by heating. In particular, the following metal oxides are common curatives that will function in the present invention: ZnO, CaO, MgO, $Al_2O_3$, $CrO_3$, FeO, $Fe_2O_3$, and NiO. These metal oxides can be used alone or in conjunction with the corresponding metal fatty acid complex (e.g., zinc stearate, calcium stearate, etc.), or with the organic and fatty acids added alone, such as stearic acid, and optionally other curatives such as sulfur or a sulfur compound, an alkylperoxide compound, diamines or derivatives thereof (e.g., DIAK products sold by DuPont). (See also, *Formulation Design and Curing Characteristics of NBR Mixes for Seals*, RUBBER WORLD 25-30 (1993)). This method of curing elastomers may be accelerated and is often used for the vulcanization of elastomer blends.

The acceleration of the cure process is accomplished in the present invention by adding to the composition an amount of an accelerant, often an organic compound. The mechanism for accelerated vulcanization of natural rubber involves complex interactions between the curative, accelerator, activators and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), 2-mercaptobenzothiazole disulfide (MBTS), hexamethylene-1,6-bisthiosulfate disodium salt dihydrate (sold commercially as DURALINK™ HTS by Flexsys), 2-(morpholinothio) benzothiazole (MBS or MOR), blends of 90% MOR and 10% MBTS (MOR90), N-tertiarybutyl-2-benzothiazole sulfenamide (TBBS), and N-oxydiethylene thiocarbamyl-N-oxydiethylene sulfonamide (OTOS), zinc 2-ethyl hexanoate (ZEH), and "thioureas".

In one embodiment, the nanocomposite also comprises a curative selected from sulfur, sulfur-based compounds, metal oxides, metal oxide complexes, fatty acids, peroxides, diamines, and mixtures thereof.

In other embodiments, desirable elastomer impermeability is achieved by the presence of at least one polyfunctional curative. An embodiment of such polyfunctional curatives can be described by the formula Z-$R^7$-Z', wherein $R^7$ is one of a $C_1$ to $C_{15}$ alkyl, $C_2$ to $C_{15}$ alkenyl, and $C_6$ to $C_{12}$ cyclic aromatic moiety, substituted or unsubstituted; and Z and Z' are the same or different and are one of a thiosulfate group, mercapto group, aldehyde group, carboxylic acid group, peroxide group, alkenyl group, or other similar group that is capable of crosslinking, either intermolecularly or intramolecularly, one or more strands of a polymer having reactive groups such as unsaturation. So-called bis-thiosulfate compounds are an example of a class of polyfunctional compounds included in the above formula. Non-limiting examples of such polyfunctional curatives are as hexamethylene bis(sodium thiosulfate) and hexamethylene bis(cinnamaldehyde), and others are well known in the rubber compounding arts. These and other suitable agents are disclosed in, for example, the BLUE BOOK, MATERIALS, COMPOUNDING INGREDIENTS, MACHINERY AND SERVICES FOR RUBBER (Don. R. Smith, ed., Lippincott & Petto Inc. 2001). The polyfunctional curative, if present, may be present in the nanocomposite from 0.1 to 8 phr in one embodiment, and from 0.2 to 5 phr in yet another embodiment.

A processing aid may also be included. Processing aids include, but are not limited to, plasticizers, tackifiers, extenders, chemical conditioners, homogenizing agents and peptizers such as mercaptans, petroleum and vulcanized vegetable oils, mineral oils, parraffinic oils, polybutene polymers, naphthenic oils, aromatic oils, waxes, resins, rosins, synthetic fluids for processing oil or aid due to their low pour point, low emission, etc., compared to paraffinic or mineral oil and the like.

The aid is typically present from 1 to 70 phr in one embodiment, from 3 to 60 phr in another embodiment, and from 5 to 50 phr in yet another embodiment.

Some commercial examples of processing aids are SUNDEX™ (Sun Chemicals), a naphthenic processing oil, PARAPOL™ (ExxonMobil Chemical Company), a polybutene processing oil having a number average molecular weight of from 800 to 3000, and FLEXON™ (ExxonMobil Chemical Company), a paraffinic petroleum oil. In one embodiment of the invention, paraffinic, naphthenic and aromatic oils are substantially absent, meaning, they have not been deliberately added to the compositions used to make the air barriers, or, in the alternative, if present, are only present up to 0.2 wt % of the compositions used to make the air barriers. In another embodiment of compositions of the invention, naphthenic and aromatic oils are substantially absent. Commercial examples of these include, for example, FLEXON oils (which contain some aromatic moieties) and CALSOL oils (a naphthenic oil).

Preferred plasticizers also include polyalphaolefins (PAOs), high purity hydrocarbon fluid compositions (HPFCs) and Group III basestocks such as those described in WO 2004/014998 at page 16, line 14 to page 24, line 1. Particularly preferred PAOs include oligomers of decene and co-oligomers of decene and dodecene. Preferred PAOs are available under the trade name SuperSyn PAO from ExxonMobil Chemical Company, Houston, Tex.

In another embodiment, at least one plastomer may be present in the blends of invention. Useful plastomers comprise ethylene derived units and from 10 wt % to 30 wt % of $C_3$ to $C_{10}$ α-olefin derived units. In another embodiment, the plastomer comprises ethylene derived units and from 10 wt % to 30 wt % of units selected from 1-butene, 1-hexene and 1-octene derived units. In yet another embodiment, the plastomer comprises ethylene derived units and from 10 wt % to 30 wt % of octene derived units. The plastomer may have a melt index of from 0.1 to 20 dg/min, and from 0.1 to 10 dg/min in another embodiment.

In these embodiments, plastomers may be metallocene catalyzed copolymers of ethylene derived units and higher α-olefin derived units such as propylene, 1-butene, 1-hexene and 1-octene, and which contain enough of one or more of these comonomer units to yield a density between 0.860 and 0.900 g/cm³ in one embodiment. The molecular weight distribution (Mw/Mn) of desirable plastomers ranges from 2 to 5 in one embodiment, and from 2.2 to 4 in another embodiment. Examples of these commercially available plastomers are EXACT™ resins 4150, a copolymer of ethylene and 1-hexene, the 1-hexene derived units making up from 18 to 22 wt % of the plastomer and having a density of 0.895 g/cm³ and MI of 3.5 dg/min (ExxonMobil Chemical Company, Houston, Tex.); and EXACT™ resin 8201, a copolymer of ethylene and 1-octene, the 1-octene derived units making up from 26 to 30 wt % of the plastomer, and having a density of 0.882 g/cm³ and MI of 1.0 dg/min (ExxonMobil Chemical Company, Houston, Tex.).

In one embodiment, the plastomer is present in the nanocomposite from 2 to 20 phr, and from 10 to 15 phr in another embodiment.

In another aspect, the nanocomposite may also comprise a processing oil or aid. The oil is selected from parraffinic oils and polybutene processing oils, and mixtures thereof in one embodiment, and is a polybutene oil in another embodiment. The processing oil is present from 2 to 20 phr in one embodiment, and from 5 to 18 phr in another embodiment. Rosin oils may be present in compositions of the invention from 0.1 to 5 phr in one embodiment, and from 0.2 to 2 phr in another embodiment. Desirably, oils and processing aids comprising unsaturation comprise less than 2 phr of the compositions of the invention in one embodiment.

The nanocomposites produced in accordance with the present invention may also contain other components and additives customarily used in rubber mixes, such as effective amounts of other nondiscolored and nondiscoloring processing aids, pigments, accelerators, crosslinking and curing materials, antioxidants, antiozonants. General classes of accelerators include amines, diamines, guanidines, thioureas, thiazoles, thiurams, sulfenamides, sulfenimides, thiocarbamates, xanthates, and the like. Crosslinking and curing agents include sulfur, zinc oxide, and fatty acids. Peroxide cure systems may also be used. The components, and other curatives, are typically present from 0.1 to 10 phr in the composition.

In another embodiment, the nanocomposite may also comprise an additional rubber selected from natural rubbers, polyisoprene rubber, styrene-butadiene rubber (SBR), polybutadiene rubber, isoprene-butadiene rubber (IBR), styrene-isoprene-butadiene rubber (SIBR), ethylene-propylene rubber, ethylene-propylene-diene rubber (EPDM), polysulfide, nitrile rubber, propylene oxide polymers, poly(isobutylene-co-p-methylstyrene), halogenated poly(isobutylene-co-p-methylstyrene), poly(isobutylene-co-cyclopentadiene), halogenated poly(isobutylene-co-cyclopentadiene), and mixtures thereof. In another embodiment, the composition also comprises from 5 to 30 phr of a natural rubber.

In certain embodiments, a useful formulation for property evaluation would be as follows:

| Material I.D. | Parts |
|---|---|
| Elastomer/Clay MB | 108.0 (100 parts of rubber and 8 parts of clay) |
| Carbon black N660 | 60.0 |
| Stearic Acid | 1.0 |
| ZnO Kadox 911 | 1.0 |
| MBTS | 1.0 |

Carbon black N660 can be obtained from, e.g., Cabot Corp. (Billerica, Mass.). Stearic acid, a cure agent, can be obtained from, e.g., C. K. Witco Corp. (Taft, La.), Kadox 911, an activator, can be obtained from C. P. Hall (Chicago, Ill.). MBTS, 2-mercaptobenzothiazole disulfide, can be obtained from R. T. Vanderbilt (Norwalk, Conn.) or Elastochem (Chardon, Ohio).

INDUSTRIAL APPLICABILITY

The nanocomposites of the invention may be extruded, compression molded, blow molded, injection molded, and laminated into various shaped articles including fibers, films, layers, industrial parts such as automotive parts, appliance housings, consumer products, packaging, and the like.

In particular, the nanocomposites are useful as in articles such as truck tires, bus tires, passenger automobile tires, motorcycle tires, off-road tires, air craft tires, and the like. The nanocomposites may either serve as a material fabricated into a finished article or a component of a finished article. The article may be selected from air barriers, air membranes, films, layers (microlayers and/or multilayers), innerliners, innertubes, treads, bladders, and sidewalls.

EXAMPLES

TABLE 1

Examples 1-4

| Example # | Filler Type | Polyisobutylene amine (NCS S00226) | HCl solution (concentration, 0.5 N) | d-spacing (Å) |
|---|---|---|---|---|
| Example 1 | Cloisite ® Na+ (20 g) | 28.9 g | 39 mL | 43.27, 20.65, 11.74 |
| Example 2 | Cloisite ® Na+ (20 g) | 33.0 g | 45 mL | 42.01, 14.57, |
| Example 3 | (Kunipia) (20 g) | 33.0 g | 45 mL | 14.322 |
| Example 4 | SOMASIF ™ ME-100 (20 g) | 20.0 g | 30 mL | 53.46, 26.04, 15.09 |

Cloisite™ Na+ was obtained from Southern Clay Products, Inc., Gonzales, Tex. Kunipia™ was obtained from Kunimine Industrial Co., Ltd., Japan. SOMASIF™ ME-100 was obtained from Co-Op Chemical Co., Ltd., Japan.

Methanol (500 mL) was added to a reactor and heated to 60° C. To the methanol was added Polyisobutylene amine (NCS S00226) and HCl solution. In the Polyisobutylene amine, 33 wt % of it is a paraffinic solvent. The polymer component of the Polyisobutylene amine, before functionalization, has a number average molecular weight of 1,000 as determined by gel permeation chromatography. After stirring the mixture for 3 hr, the Cloisite® Na+ or filler was added and the mixture was stirred for 4 more hr. The solution was then collected into a flask. The filler then settled to the bottom of flask to produce residue filler. The top clear solution was decanted and discarded. To the residue filler was added methanol (300 mL) and the filler settled to the bottom of flask again. The top clear solution was decanted and discarded again. The process was repeated twice. The final residue filler was washed with methanol (300 mL). The collected solid was air-dried and then vacuum-dried at 100° C. overnight. The product was milled and d-spacing was measured as according to the description described herein and reported above.

TABLE 2

Examples 5-7

| Example # | Rubber: MDX 03-1 | Type of Modified Layered Filler (4.4 gram) | Permeation rate mm · cc/m² · day at 40° C.) |
|---|---|---|---|
| Example 5 | 55 g | Example 1 | 93.44, 90.12 |
| Example 6 | 55 g | Example 2 | 97.18, 96.85 |
| Example 7 | 55 g | Example 3 | 104.62, 103.51 |

| Mooney Viscosity* [ML (1 + 8) 125° C.] | BrPMS, Mol % | PMS, Wt % | |
|---|---|---|---|
| BIMS 1* | 33 ± 5 | 0.85 ± 0.05 | 10 ± 1 |
| BIMS 2** | 31 | 1.0 | 8 |

*Mooney viscosity was determined according to ASTM D 1646.
**BIMS-Brominated Isobutylene para-methylstyrene (available for ExxonMobil Chemical Company, Houston, TX)

BIMS 1 was pre-dissolved in 500 mL of cyclohexane. The solution was transferred into a reactor. To the solution was added the modified layered filler. The mixture was stirred for 3 hrs at 60° C. The solvent was evaporated and the product was dried under vacuum overnight to produce a dried product. Thirty-six grams of the dried product was loaded into a Branbender™ mixer at 150° C. at 60 rpm. After one minute, 20 grams of carbon black were added and mixed for 7 minutes. All the carbon black mixture was loaded into a Branbender™ mixer at 45° C. and 40 rpm. After one minute, conventional curatives were added (Stearic acid: 0.33 grams, Kadox 911: 0.33 grams, MBTS: 0.33 grams) and mixed for 3 minutes to create a compounded sample. The compounded sample was then milled, pressed, and cured for permeation measurements according to the description described herein and reported above.

TABLE 3

Example 8-11

| Example # | d-spacing (Å) | Permeation rate mm · cc/m² · day at 40° C. |
|---|---|---|
| Example 8 | 86.14, 15.64 | — |
| Example 9 | — | 102.84, 103.97 |

TABLE 3-continued

Example 8-11

| Example # | d-spacing (Å) | Permeation rate mm · cc/m² · day at 40° C. |
|---|---|---|
| Example 10 | >88, 14.43 | — |
| Example 11 | — | 95.65, 95.70 |

Example 8

Polyisobutylene amine (NCS S00226, 5.0 gram) was added to methanol (200 mL). To the solution was added a HCl solution (concentration: 12M, Volume: 1 mL) and the mixture was stirred for 2 hrs. Then, Colisite® Na⁺ (3.4 gram) was added to the solution and stirred for 3 hrs at 80° C. To the solution was added 64 grams of BIMS 2 in 700 mL of hexane. After stirring the mixture for 2 hrs, the product was collected and the solvent was evaporated. It was further dried under vacuum at 90° C. until the weight of sample remained constant.

Example 9

Thirty-six grams of dried product (example 8) was loaded into a Branbender™ mixer at 150° C. at 60 rpm. After one minute, 20 grams of carbon black were added and mixed for 7 minutes. The carbon black mixture was then loaded into a Branbender™ mixer at 45° C. and 40 rpm. After one minute, conventional curatives (Stearic acid: 0.33 grams, Kadox 911: 0.33 grams, MBTS: 0.33 grams) were added and mixed for 3 minutes to produce a compounded sample. The compounded sample was then milled and pressed for permeation measurements according to the description described herein and reported above.

Example 10

Polyisobutylene amine (NCS S00226, 5.0 gram) was added to methanol (200 mL) to produce a solution. To the solution was added a HCl solution (concentration: 12M, Volume: 1 mL) and the solution was stirred for 2 hrs. Then Colisite® Na⁺ (3.4 gram) was added and stirred for 3 hrs at 80° C.: To the solution was added 64 grams of BIMS 2 in 700 mL of hexane. After stirring the mixture for 2 hrs, the product was poured into ethyl alcohol (800 mL). The product was then washed with ethyl alcohol (200 mL) and repeated. It was dried under a vacuum at 90° C. until the weight of sample remained constant.

Example 11

Thirty-six grams of dried product (example 10) was loaded into a Branbender mixer at 150° C. at 60 rpm. After one minute, 20 grams of carbon black were added and mixed for 7 minutes. The carbon black mixture was loaded into a Branbender™ mixer at 45° C. at 40 rpm. After one minute, conventional curatives (Stearic acid: 0.33 grams, Kadox 911: 0.33 grams, MBTS: 0.33 grams) were added and mixed for 3 minutes to produce a compounded sample. The compounded sample was then milled and pressed for permeation measurements according to the description described herein and reported above.

TABLE 4

Example 12-13

| Products # | Filler (4.8 grams) | Dimethylcioctadecyl-ammonium bromide | Polyisobutylene-amine (NCS S00226) | HCl solution (Concentration: 0.5 N in Butyl alcohol) | Permeation rate mm · cc/m² · day at 40° C.) |
|---|---|---|---|---|---|
| Example 12 | Cloisite ® Na⁺ | 0.67 gram | 5.4 grams | 6 mL | 99.67, 96.24 |
| Example 13 | Kumpia | 1.00 gram | 7.7 grams | 9.0 mL | 93.21, 95.28 |

The unmodified clay of Table 4 was loaded into a reactor containing 180 mL of water at 70° C. and the mixture was stirred for 2 hrs. During the same period, polyisobutylene amine in tetrahydrofuran (THF) (70 mL) was mixed with a HCl solution by shaking for half an hour. To this solution, was added dimethyldioctadecylammonium bromide and mixed by shaking for 1 hour. The prepared solution was added to the reactor and the mixture was stirred for 6 hours at 70° C. Then a BIMS 1 solution in cyclohexane (500 mL) was added and mixed for 12 hr. The solution was poured into isopropyl alcohol (1.5 L) and the product was then dried under a vacuum at 90° C. for 48 hrs to produce a dried product. Thirty-six grams of dried product (example 10) was loaded into a Branbender™ mixer at 150° C. at 60 rpm. After one minute, 20 grams of carbon black were added and mixed for 7 minutes. The carbon black mixture was then loaded into a Branbender™ mixer at 45° C. at 40 rpm. After one minute, conventional curatives (Stearic acid: 0.33 grams, Kadox 911: 0.33 grams, MBTS: 0.33 grams) were added and mixed for 3 minutes to produce a compounded sample. The compounded sample was then milled and pressed for permeation measurements according to the description described herein and reported above.

All patents and patent applications, test procedures (such as ASTM methods), and other documents cited herein are fully incorporated by reference to the extent such disclosure is consistent with this invention and for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and can be readily made by those skilled in the art without departing

We claim:

1. A nanocomposite composition comprising:
an elastomeric composition; and
a modified layered filler comprising:
at least one layered filler and at least one modifying agent comprising at least one polymer chain E comprising (a) end-functionalized poly(isobutylene) having a carbon chain length of from $C_{40}$-$C_{500}$ and (b) an ammonium-functionalized group.

2. The nanocomposite composition of claim 1, wherein the ammonium-functionalized group comprises an ammonium salt comprising at least one an onium salt, a quaternary ammonium salt, or a tertiary ammonium salt.

3. The nanocomposite composition of claim 1, wherein the ammonium-functionalized group is described by the following group pendant to the polymer chain E:

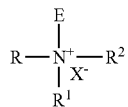

wherein each R, $R^1$ and $R^2$ are the same or different and independently selected from hydrogen, $C_1$ to $C_{26}$ alkyl, alkenes or aryls, substituted $C_1$ to $C_{26}$ alkyls, alkenes or aryls, $C_1$ to $C_{26}$ aliphatic alcohols or ethers, $C_1$ to $C_{26}$ carboxylic acids, nitriles, ethoxylated amines, acrylates and esters; and wherein $X^-$ is a counterion of ammonium such as $Br^-$, $Cl^-$, or $PF_6^-$.

4. The nanocomposite composition of claim 1, wherein the at least one polymer chain E comprises a carbon chain length of from $C_{40}$ to $C_{400}$.

5. The nanocomposite composition of claim 1, wherein the at least one layered filler comprises at least one layered clay.

6. The nanocomposite composition of claim 1, wherein the at least one polymer chain E comprises isoolefin derived units.

7. The nanocomposite composition of claim 1, wherein the modifying agent comprises at least one end-functionalized polyisobutylene amine.

8. The nanocomposite composition of claim 1, wherein the at least one polymer chain E does not comprise propylene derived units.

9. The nanocomposite composition of claim 1, wherein the elastomeric composition comprises at least one isobutylene based polymer.

10. The nanocomposite composition of claim 9, wherein the at least one isobutylene based polymer comprises at least one interpolymer of a $C_4$-$C_7$ isoolefin and an alkylstyrene.

11. The nanocomposite composition of claim 9, wherein the at least one isobutylene based polymer comprises at least one copolymer of a $C_4$-$C_7$ isoolefin and a multiolefin.

12. The nanocomposite composition of claim 9, wherein the isobutylene based polymer is functionalized to form a functionalized isobutylene based polymer.

13. The nanocomposite composition of claim 12, wherein the functionalized isobutylene based polymer is halogenated with bromine or chlorine.

14. A process of producing a nanocomposite composition of claim 12, the process comprising melt mixing.

15. A process of producing a nanocomposite composition of claim 12, the process comprising solution blending.

16. The process of claim 15, wherein the solution blending comprises contacting in a solution the elastomeric composition and the modified layered filler to form the nanocomposite composition; and drying the nanocomposite composition.

17. The process of claim 15, wherein the solution blending comprises contacting in a solution the elastomeric composition and the at least one layered filler and at least one modifying agent comprising at least one polymer chain E comprising end-functionalized poly(isobutylene) having a carbon chain length of from $C_{40}$ to $C_{500}$ and an ammonium-functionalized group to form the nanocomposite composition.

18. The process of claim 15, wherein the solution blending comprises contacting Solution A comprising the modified layered filler with Solution B comprising the elastomeric composition to form the nanocomposite composition.

19. The process of claim 18, wherein the Solution A comprises at least one alcohol, $H_2O$, or mixtures thereof.

20. The process of claim 18 or 19, wherein Solution B comprises a hydrocarbon solvent.

* * * * *